(12) United States Patent
Peterson et al.

(10) Patent No.: US 11,949,161 B2
(45) Date of Patent: Apr. 2, 2024

(54) SYSTEMS AND METHODS FOR MAKING ARTICLES COMPRISING A CARBON NANOTUBE MATERIAL

(71) Applicant: Eagle Technology, LLC, Melbourne, FL (US)

(72) Inventors: Ian D. Peterson, Rochester, NY (US); Monica L. Rommel, Lowell, MA (US); Jane Bonnett, Rochester, NY (US)

(73) Assignee: Eagle Technology, LLC, Melbourne, FL (US)

( * ) Notice: Subject to any disclaimer, the term of this patent is extended or adjusted under 35 U.S.C. 154(b) by 74 days.

(21) Appl. No.: 17/460,059

(22) Filed: Aug. 27, 2021

(65) Prior Publication Data

US 2023/0064037 A1 Mar. 2, 2023

(51) Int. Cl.
| | |
|---|---|
| *H01Q 15/16* | (2006.01) |
| *B29C 65/48* | (2006.01) |
| *B29C 70/44* | (2006.01) |
| *B29K 307/04* | (2006.01) |
| *B29L 31/34* | (2006.01) |

(52) U.S. Cl.
CPC ....... *H01Q 15/168* (2013.01); *B29C 65/4835* (2013.01); *B29C 70/44* (2013.01); *B29C 2793/0081* (2013.01); *B29K 2307/04* (2013.01); *B29K 2995/0003* (2013.01); *B29K 2995/0012* (2013.01); *B29L 2031/3456* (2013.01)

(58) Field of Classification Search
CPC .......... H01Q 15/168; H01Q 3/16; H01Q 3/20; B29C 65/4835
USPC .......................................................... 343/912
See application file for complete search history.

(56) References Cited

U.S. PATENT DOCUMENTS

| | | |
|---|---|---|
| 1,079,740 A | 11/1913 | Schmuel et al. |
| 2,072,262 A | 3/1937 | Herzog et al. |
| 4,609,923 A | 9/1986 | Boan et al. |
| 4,812,854 A | 3/1989 | Boan et al. |
| 4,926,181 A | 5/1990 | Stumm |
| 5,686,930 A | 11/1997 | Brydon |
| 5,864,324 A | 1/1999 | Acker et al. |
| 6,590,231 B2 | 7/2003 | Watanabe et al. |
| 6,828,949 B2 | 12/2004 | Harless |
| 6,864,857 B2 | 3/2005 | Crouch et al. |

(Continued)

FOREIGN PATENT DOCUMENTS

| | | | | |
|---|---|---|---|---|
| CN | 106159456 A | 11/2016 | | |
| EP | 617481 A1 * | 9/1994 | ........... | H01Q 15/162 |

(Continued)

OTHER PUBLICATIONS

European Search Report issued in European Patent Application No. 22166068.1 dated Sep. 28, 2022.

(Continued)

*Primary Examiner* — Ricardo I Magallanes
*Assistant Examiner* — Brandon Sean Woods
(74) *Attorney, Agent, or Firm* — Fox Rothschild LLP; Carol E. Thorstad-Forsyth

(57) ABSTRACT

Systems and methods for making an antenna reflector. The methods comprise: obtaining a Carbon Nano-Tube ("CNT") material; cutting the CNT material into a plurality of wedge shaped pieces; and bonding together the wedge shaped pieces using a resin film adhesive to form the antenna reflector with a three dimensional contoured surface.

6 Claims, 17 Drawing Sheets

(56) References Cited

U.S. PATENT DOCUMENTS

| | | |
|---|---|---|
| 6,901,249 B1 | 5/2005 | Kobayashi |
| 6,975,282 B2 | 12/2005 | Kaufman et al. |
| 7,354,877 B2 | 4/2008 | Rosenberger et al. |
| 7,714,798 B2 | 5/2010 | Lashmore et al. |
| 7,734,271 B2 | 6/2010 | Pepper et al. |
| 8,356,774 B1 | 1/2013 | Banik et al. |
| 8,384,613 B1 | 2/2013 | Murphey et al. |
| 8,462,078 B2 | 6/2013 | Murphey et al. |
| 8,548,415 B2 | 10/2013 | Pesetski et al. |
| 8,654,033 B2 | 2/2014 | Sorrell et al. |
| 8,926,933 B2 | 1/2015 | Zhang et al. |
| 9,156,568 B1 | 10/2015 | Spence et al. |
| 9,214,722 B2 | 12/2015 | Georgakopoulos et al. |
| 9,276,305 B2 | 3/2016 | Keller et al. |
| 9,318,808 B1 | 4/2016 | Weaver et al. |
| 9,496,436 B2 | 11/2016 | Hui et al. |
| 9,512,545 B2 | 12/2016 | Zhang et al. |
| 9,605,363 B2 | 3/2017 | Zhang et al. |
| 9,810,820 B1 | 11/2017 | Starkovich et al. |
| 10,447,178 B1 | 10/2019 | Hays et al. |
| 10,651,531 B2 | 5/2020 | Palisoc et al. |
| 10,715,078 B2 | 7/2020 | Jeon et al. |
| 10,797,402 B2 | 10/2020 | Shmuel et al. |
| 10,899,102 B1 | 1/2021 | Starkovich et al. |
| 11,600,929 B2 * | 3/2023 | Socransky ............... B29C 41/12 |
| 2001/0023968 A1 | 9/2001 | Smith et al. |
| 2002/0014999 A1 | 2/2002 | Crowley |
| 2004/0002357 A1 | 1/2004 | Benveniste |
| 2004/0023576 A1 | 2/2004 | Rock et al. |
| 2005/0009593 A1 | 1/2005 | Falciglia |
| 2005/0056877 A1 | 3/2005 | Rueckes et al. |
| 2005/0095938 A1 | 5/2005 | Rosenberger et al. |
| 2005/0179594 A1 | 8/2005 | Morikawa et al. |
| 2005/0282515 A1 | 12/2005 | Bertin |
| 2006/0027030 A1 | 2/2006 | Schofl |
| 2006/0261433 A1 | 11/2006 | Manohara et al. |
| 2006/0270301 A1 | 11/2006 | Marks |
| 2007/0281657 A1 | 12/2007 | Brommer et al. |
| 2008/0063585 A1 * | 3/2008 | Smalley .................... D01F 9/12 |
| | | 530/331 |
| 2008/0223431 A1 | 9/2008 | Chu |
| 2008/0251723 A1 | 10/2008 | Ward et al. |
| 2010/0086729 A1 | 4/2010 | Long |
| 2010/0258111 A1 | 10/2010 | Shah et al. |
| 2011/0009751 A1 | 1/2011 | McGuire, Jr. et al. |
| 2011/0097512 A1 | 4/2011 | Zhou et al. |
| 2011/0180661 A1 | 7/2011 | Weaver |
| 2012/0055013 A1 | 3/2012 | Finn |
| 2012/0312343 A1 | 12/2012 | VanVechten et al. |
| 2015/0329363 A1 | 11/2015 | Sullivan |
| 2016/0376747 A1 | 12/2016 | Wang et al. |
| 2017/0001866 A1 | 1/2017 | Zhang et al. |
| 2017/0027439 A1 | 2/2017 | Shimizu et al. |
| 2017/0120220 A1 | 5/2017 | Watanabe et al. |
| 2017/0274390 A1 | 9/2017 | Manyapu et al. |
| 2018/0278200 A1 | 9/2018 | Jeon et al. |
| 2019/0221944 A1 | 7/2019 | Harless et al. |
| 2020/0362236 A1 | 11/2020 | Cui et al. |
| 2021/0036429 A1 | 2/2021 | Rommel et al. |
| 2021/0098888 A1 | 4/2021 | Socransky |
| 2021/0257743 A1 * | 8/2021 | Puchades ............. H01Q 15/141 |

FOREIGN PATENT DOCUMENTS

| | | | |
|---|---|---|---|
| EP | 0917283 | A2 | 5/1999 |
| EP | 1727239 | A1 | 11/2006 |
| EP | 2290511 | A2 | 3/2011 |
| EP | 3059800 | B1 | 11/2017 |
| KR | 20070071918 | A | 7/2007 |
| TW | 201035341 | A | 10/2010 |
| WO | 2001003208 | A1 | 1/2001 |
| WO | 2004030043 | A2 | 4/2004 |
| WO | 2017120478 | A1 | 7/2017 |

OTHER PUBLICATIONS

High Frequency Reflective Mesh for Small Aperture Antennas, SPIR Award, Tracking No. 156678, funding solicited in 2016, awarded in 2017 https://www.sbir.gov/sbirsearch/detail/1425893.

Nanocomp Technologies, Inc. A Huntsman Company, Miralon Yarn, http://www.miralon.com/yarn, copyright 2016 Nanocomp Technologies Inc.

Shirasu, Keiichi & Yamamoto, Go & Tamaki, Itaru & Ogasawara, Toshio & Shimamura, Yoshinobu & Inoue, Yoku & Hashida, Toshiyuki. (2015). Negative axial thermal expansion coefficient of carbon nanotubes: Experimental determination based on measurements of coefficient of thermal expansion for aligned carbon nanotube reinforced epoxy composites. Carbon. 95. 904-909. 10.1016/j.carbon.2015.09.026.

G. Hidden, L. Boudou, S. Remaury, P. Nabarra, E. Flahaut and J. M. Vega, "Development of CNT-polysiloxane composites for spacecraft applications," Proceedings of the 2004 IEEE International Conference on Solid Dielectrics, 2004. ICSD 2004., Toulouse, France, 2004, pp. 955-958 Vol.2, doi: 10.1109/ICSD.2004.1350590.

European Search Report issued in EP 20186379 dated Nov. 25, 2020.

J. Beigbeder, P. Demont, S. Remaury, P. Nabarra and C. Lacabanne , Incorporation of Nanoparticles in a Flexible Solar Reflector for Geostationary Applications, International Symposium on Materials in a Space Environment, 2009.

Andreas Ericsson, Romain Rumpler, Daniel Sjoberg, Peter Goransson, Niklas Wellander, Joakim Johansson, A combined electromagnetic and acoustic analysis of a triaxial carbon fiber weave for reflector antenna applications, Aerospace Science and Technology, vol. 58, Nov. 2016, pp. 401-417.

"Tunable Mechanical Metamaterials through Hybrid Kirigami Structures" Hwang, D., Bartlett, M.D. Tunable Mechanical Metamaterials through Hybrid Kirigami Structures. Sci Rep 8, 3378 (2018) doi:10.1038/s41598-018-21479-7.

"LASEC: Instant Fabrication of Stretchable Circuits Using a Laser Cutter" Daniel Groeger and Jürgen Steimle. 2019. In Proceedings of the 2019 CHI Conference on Human Factors in Computing Systems (CHI '19). ACM, New York, NY, USA, Paper 699, 14 pages. DOI: https://doi.org/10.1145/3290605.3300929.

"Graphene kirigami" Melina K. Blees, Arthur W. Barnard, Peter A. Rose, Samantha P. Roberts, Kathryn L. McGill, Pinshane Y. Huang, Alexander R. Ruyack, Joshua W. Kevek, Bryce Kobrin, David A. Muller & Paul L. McEuen.

"Carbon Nanotube Assembly and Integration for Applications" Anusha Venkataraman, Eberechukwu Victoria Amadi, Yingduo Chen, Chris Papadopoulos Nanoscale Res Lett. 2019; 14: 220. Published online Jul. 1, 2019.

El-sherbiny, Sh.G. & Wageh, S. & Elhalafawy, S.M. & Sharshar, A.A.. (2013). Carbon nanotube antennas analysis and applications: review. Advances in nano research.

Williams and Ruth "Antennas of flexible nanotube films an alternative for electronics" Jun. 10, 2019, News Releases.

* cited by examiner

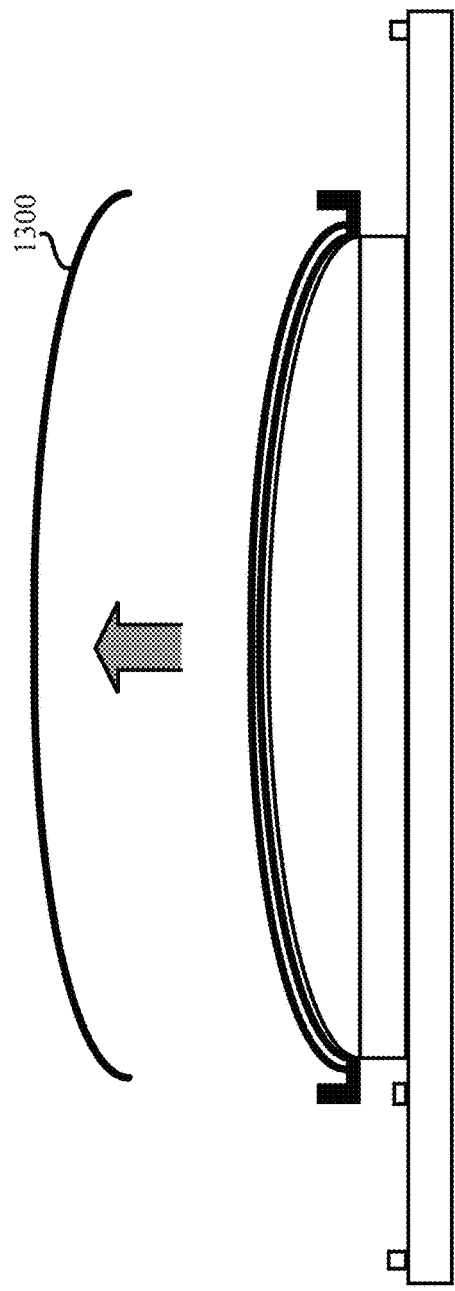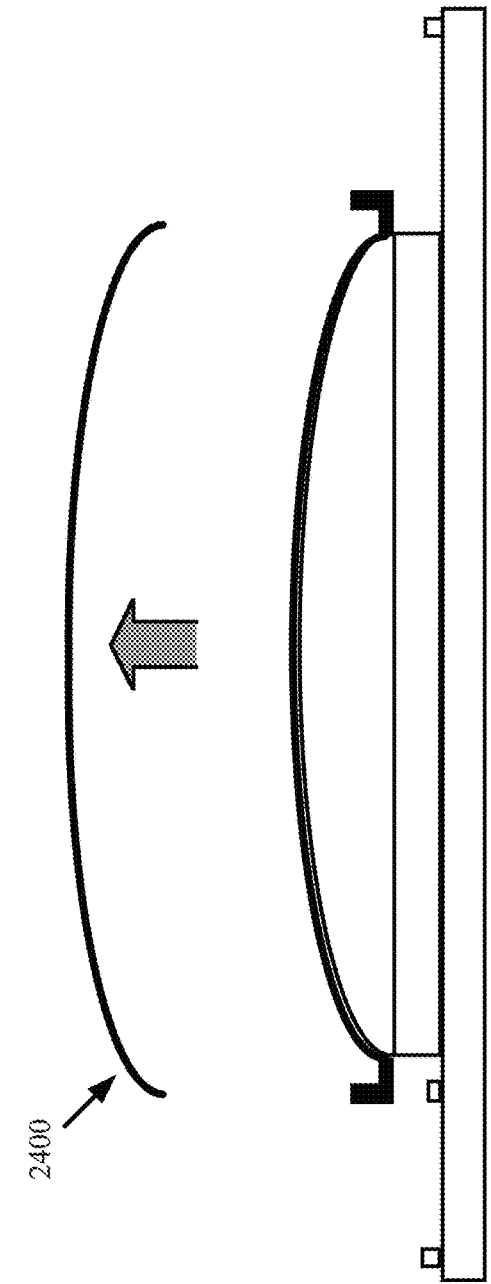

SYSTEMS AND METHODS FOR MAKING ARTICLES COMPRISING A CARBON NANOTUBE MATERIAL

BACKGROUND

Statement of the Technical Field

The present disclosure relates generally to mesh articles (e.g., an antenna). More particularly, the present disclosure relates to systems and methods for making articles comprising a Carbon Nano-Tube ("CNT") material.

DESCRIPTION OF THE RELATED ART

Satellites require Radio Frequency ("RF") energy concentrating antennas to provide high gain. These antennas comprise precision parabolic or similar shaped antenna reflectors that are carried into space using launch vehicles. The antenna reflectors may be formed of knitted mesh materials. One such knitted mesh material comprises a gold plated tungsten wire (e.g., such as that disclosed in U.S. Pat. No. 4,609,923) or a gold plated molybdenum wire. These gold plated wire mesh materials have two inherent deficiencies for antenna applications. First, the gold plated wire has a high solar absorptivity to hemispherical emissivity ratio (e.g., $\alpha_{solar}/\varepsilon_H=8$) which results in high mesh temperatures. Secondly, the gold plated wire has a relatively high Coefficient of Thermal Expansion ("CTE") (e.g., approximately 4.5 ppm/C° for the tungsten wire and approximately 5.0 ppm/C° for the molybdenum wire). The high (e.g., $\alpha_{solar}/\varepsilon_H$ ratio in conjunction with the high CTE results in thermal distortion of the antenna reflector due to on-orbit temperatures. This thermal distortion degrades antenna performance, for example, by reducing gain and increasing sidelobe levels.

SUMMARY

The present disclosure concerns systems and methods for making an antenna reflector. The methods comprise: obtaining a CNT material; cutting the CNT material into a plurality of wedge shaped pieces; and bonding together the wedge shaped pieces using a resin film adhesive (e.g., cyanate ester resin film) to form the antenna reflector with a three dimensional contoured surface. The wedge shaped pieces may be prevented from wrinkling or otherwise experiencing surface abnormalities during the bonding In some scenarios, adjacent ones of the wedge shaped pieces of CNT material overlap each other. Additionally or alternatively, the CNT material has a laser cut mesh pattern formed therein. The antenna reflector may have a concave or parabolic shape. A three dimensional contoured surface of the antenna reflector is smooth or otherwise absent of surface abnormalities.

In those or other scenarios, the methods also comprise: optionally cutting a release agent into a plurality of wedge shaped pieces; optionally disposing the release agent on a three dimensional contour surface of a mold structure; disposing the plurality of wedge shaped pieces of CNT material on the three dimensional contour surface of a mold structure and/or the release agent; applying the resin film adhesive to the plurality of wedge-shaped pieces of CNT material; and/or placing a dam material or structure adjacent to an edge of the resin film adhesive.

In those or other scenarios, the wedge shaped pieces of CNT material are bonded together by: applying heat and pressure to the resin film adhesive and the plurality of wedge shaped pieces of CNT material; and allowing the resin film adhesive to flow into the CNT material and cure so as to stiffen the CNT material, whereby the antenna reflector is formed. The pressure may be applied using at least one of a caul structure and a vacuum bag.

In those or other scenarios, the wedge shaped pieces of CNT material are bonded together by: applying pressure to the wedge shaped pieces and the resin film adhesive; applying heat to (i) increase a temperature of the wedge shaped pieces from a first temperature to a second temperature, and (ii) reduce a viscosity of the resin film adhesive; waiting a first period of time to allow the resin film adhesive to flow into the CNT material; discontinuing application of the pressure to the wedge shaped pieces and the resin film adhesive; applying heat to (i) increase the temperature of the wedge shaped pieces from the second temperature to a third temperature, and (ii) initiate a cross-linking chemical reaction to occur within the resin system; waiting a second period of time to allow an acceptable percentage (e.g., >50%) of the resin system to cross-link; and/or discontinuing application of the heat upon expiration of the second period of time.

The present disclosure concerns antennas. The antennas comprise an antenna reflector formed of a plurality of wedge shaped pieces of a CNT material maintained in a three dimensional shape via a chemical reaction with a resin film adhesive. Adjacent ones of the plurality of wedge shaped pieces may overlap each other. The resin film adhesive may comprise a cyanate ester resin film. The CNT material may have a laser cut mesh pattern formed therein. The three dimensional shape may be a parabolic shape.

BRIEF DESCRIPTION OF THE DRAWINGS

The present solution will be described with reference to the following drawing figures, in which like numerals represent like items throughout the figures.

FIGS. 8-24 provides illustrations that are useful for understanding a method for making an antenna reflector using a CNT material.

DETAILED DESCRIPTION

Figure 1:
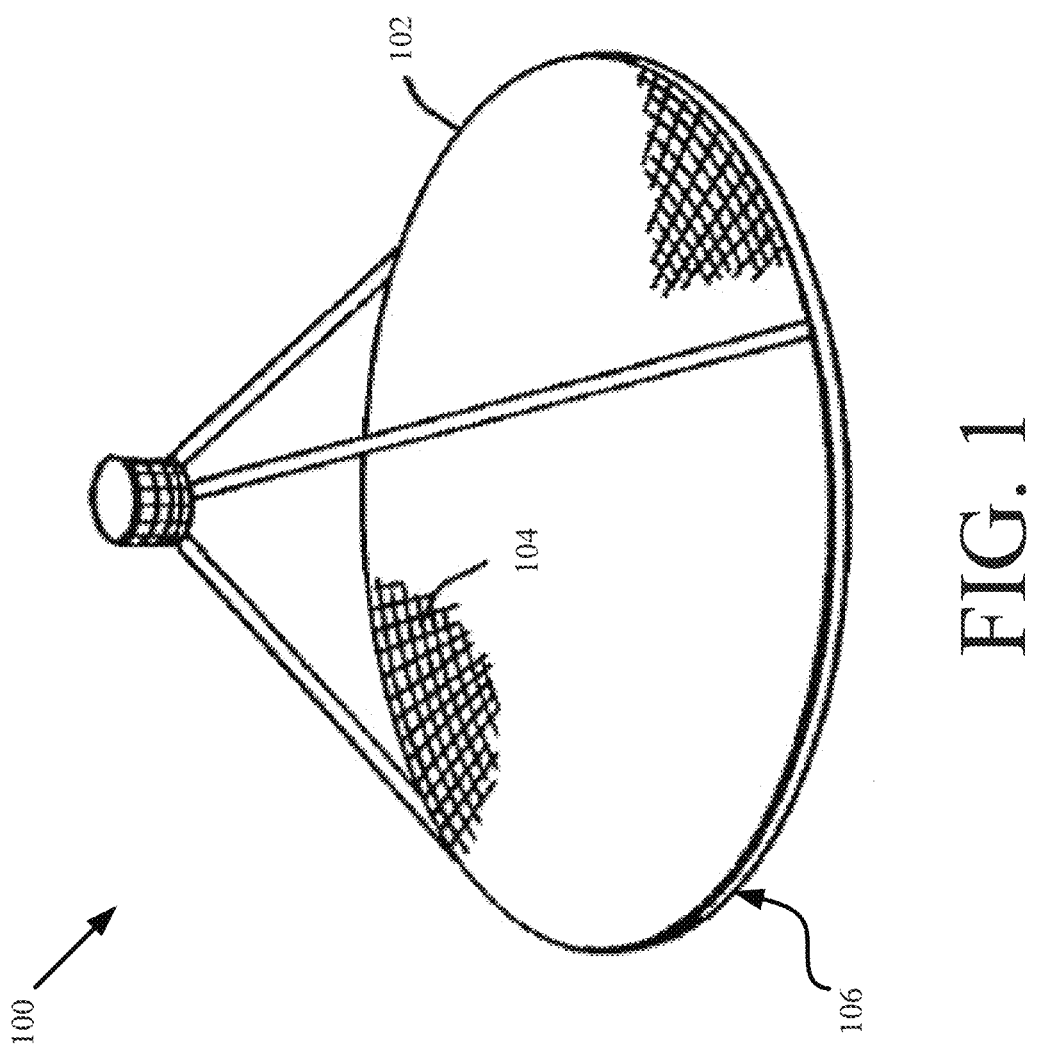
FIG. 1 provides a perspective view of an illustrative mesh antenna.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present solution may be embodied in other specific forms without departing from its spirit or essential characteristics. The described embodiments are to be considered in all respects only as illustrative and not restrictive. The scope of the present solution is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present solution should be or are in any single embodiment of the present solution. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One skilled in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

Reference throughout this specification to "one embodiment", "an embodiment", or similar language means that a particular feature, structure, or characteristic described in connection with the indicated embodiment is included in at least one embodiment of the present solution. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

The present solution concerns systems and methods for making articles comprising a CNT material. The present solution is described herein in relation to antenna applications. The present solution is not limited in this regard. The present solution disclosed herein can be used in other applications in which a contoured RF reflective material with a low (e.g., $\alpha_{solar}/\varepsilon_H$ ratio and/or a low CTE is needed.

One type of wire used for mesh antennas is a gold plated molybdenum wire (as noted above in the Background section of this paper). The gold plated molybdenum wire has the following properties: a small diameter (e.g., 0.5-1.2 mil); a high solar absorptivity to hemispherical emissivity ratio (e.g., (e.g., $\alpha_{solar}/\varepsilon_H$=8); and a high CTE (e.g., 5.0 ppm/C°). The mesh produced with gold plated molybdenum wire has an acceptable stiffness and areal density. Areal density refers to the mass of the mesh per unit area. The areal density of the mesh material is a function of wire diameter, knit type configuration, and/or openings per inch.

Despite the benefits of mesh antennas incorporating gold plated tungsten or molybdenum wire, these mesh antennas suffer from certain drawbacks. First, the gold plated wire has a high solar absorptivity to hemispherical emissivity ratio (e.g., (e.g., $\alpha_{solar}/\varepsilon_H$=8) which results in high mesh temperatures. Secondly, the gold plated wire has a relatively high CTE (e.g., approximately 4.5 ppm/C° for the tungsten wire and approximately 5.0 ppm/C° for the molybdenum wire). The high (e.g., $\alpha_{solar}/\varepsilon_H$ ratio in conjunction with the high CTE results in thermal distortion of the antenna reflector due to on-orbit temperatures.

Accordingly, the mesh antennas of the present solution are formed from a CNT material rather than from a gold plated tungsten or molybdenum wire. The CNT material has the following properties: a low solar absorptivity to hemispherical emissivity ratio ((e.g., $\alpha_{solar}/\varepsilon_H$=2); and/or a low CTE (e.g., −0.3 ppm/C°). The (e.g., $\alpha_{solar}/\varepsilon_H$ ratio and low CTE of the CNT material allows for antenna reflectors with enhanced performance and higher operational frequency capabilities. The low (e.g., $\alpha_{solar}/\varepsilon_H$ ratio reduces the thermal distortion experienced by the mesh reflector surface compared to that experienced in conventional mesh reflectors formed of gold plated tungsten or molybdenum wire by reducing mesh temperatures. The low CTE also reduces the thermal distortion experienced by the mesh reflector surface compared to that experienced in conventional mesh reflectors formed of gold plated tungsten or molybdenum wire.

In some scenarios, the CNT material is formed by laser cutting a mesh pattern in a sheet of CNT material. In other scenarios, the CNT material is formed by knitting or weaving a CNT yarn. Laser cutting and the knittability/weavability of CNT yarns allows for a relatively wide range of possible openings per inch (e.g., 10-100 openings per inch) in a mesh material. Additionally, the laser cutting and CNT yarn provides mesh materials with areal densities that are less than ten percent of the areal density of a mesh material formed using the gold plated tungsten or molybdenum wire with a diameter equal to the diameter of the CNT yarn.

Notably, the ability to create a usable mesh from a CNT material for antenna applications has not been achievable in the past. However, with the creation of a new manufacturing process described herein, a CNT material that is usable for antenna applications is now achievable.

Illustrative Antenna

Referring now to FIG. 1, there is provided an illustration of an illustrative mesh antenna 100 for radiating a narrow beam of radio waves for point-to-point communications in satellite dishes. The mesh antenna 100 has a CNT material incorporated therein. The CNT material can include, but is not limited to, a sheet of CNT material which has a mesh pattern laser cut therein and/or a mesh material formed of a CNT yarn. The CNT material can, for example, (i) comprise a plurality of carbon nano-tubes, (ii) is reflective of radio waves, (iii) has a solar absorptivity to hemispherical emissivity ratio ((e.g., $\alpha_{solar}/\varepsilon_H$ ratio) that is equal to or less than 2, and/or (iv) has a CTE that is equal to zero plus or minus 0.5 ppm/C°.

Figure 3:
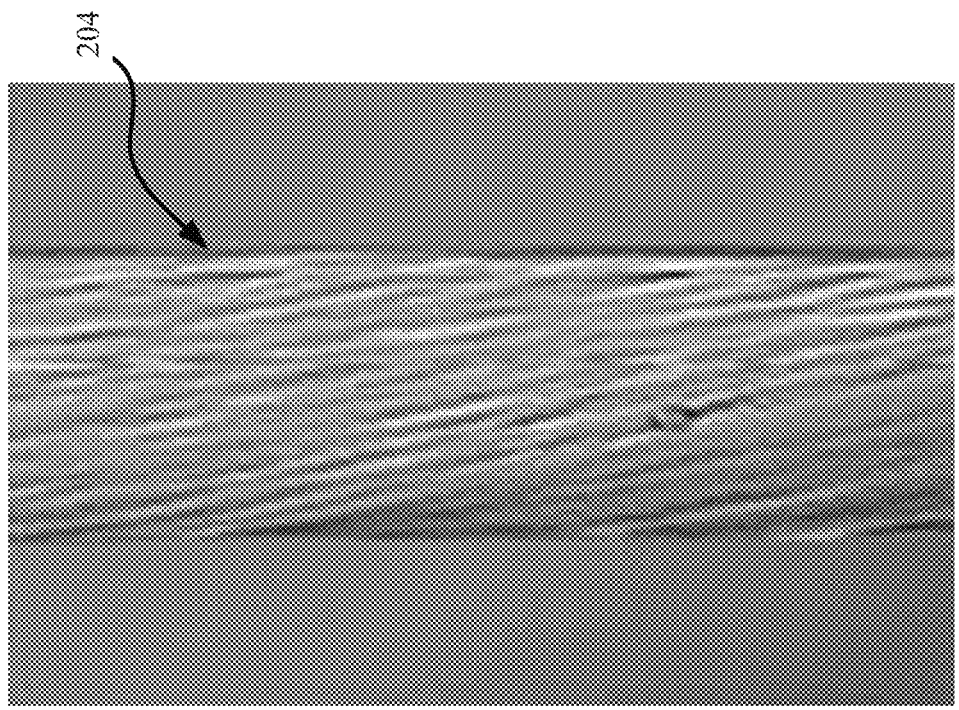
FIG. 3 shows an image of a strand of CNT yarn.

In some scenarios, the CNT yarn includes, but is not limited to, a Miralon® yarn available from Nanocomp Technologies, Inc. of Merrimack, New Hampshire. An image of the CNT yarn is provided in FIG. 3. The CNT yarn is strong, lightweight, and flexible. The CNT yarn has a low solar absorptivity to hemispherical emissivity ratio (e.g., (e.g., $\alpha_{solar}/\varepsilon_H$=2). In some scenarios, the low (e.g., $\alpha_{solar}/\varepsilon_H$ ratio is less than 25% of the (e.g., $\alpha_{solar}/\varepsilon_H$ ratio of a gold plated tungsten or molybdenum wire. The CNT yarn also has a low CTE that is more than an order of magnitude less than a CTE of a gold plated tungsten or molybdenum wire. For example, the CNT yarn has a CTE equal to −0.3 ppm/C°.

All of these features of the CNT yarn are desirable in antenna applications and/or space based applications.

As shown in FIG. 1, the mesh antenna 100 comprises an antenna reflector 102 configured to reflect Electro-Magnetic ("EM") energy in the radio wave band of the EM spectrum. The antenna reflector 102 is shown as comprising a fixed mesh reflector (i.e., an antenna reflector that does not deploy). A mechanical support structure is provided for the mesh. Such mechanical support structures are well known in the art, and therefore will not be described herein. For example, in a fixed mesh reflector scenario, the mechanical support structure comprises a hoop or ring 106 formed of a rigid or semi-rigid material (e.g., graphite composite, metal or plastic).

The antenna reflector 102 is formed of a mesh material, has a generally parabolic shape, and has a relatively high directivity. The mesh material includes, but is not limited to, a single layer of mesh. The mesh material has a number of openings per inch selected based on the frequency of the EM energy to be reflected by the mesh antenna 100 (e.g., 10-100 openings per inch). The parabolic shape focuses a beam signal into one point.

In the CNT yarn scenarios, the mesh material comprises a knitted mesh material formed of a series of interlocking loops 104 of CNT yarn. The present solution is not limited to knitted mesh materials. In other applications, the mesh material is a weave material rather than a knitted material. The weave material comprises a first set of filaments intertwined with a second set of filaments. Interstitial spaces or openings may be provided between the filaments.

Figure 2:
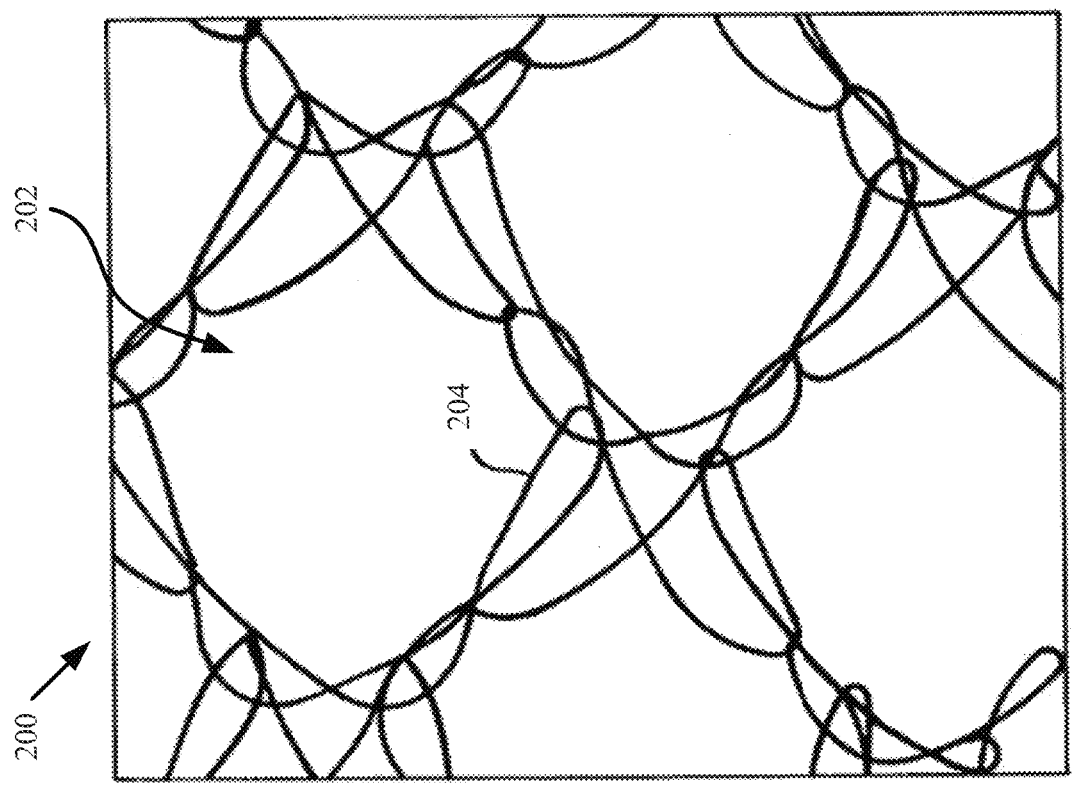
FIG. 2 provides an illustration of an illustrative mesh knit in which a CNT yarn material is incorporated.

In some scenarios, the knitted mesh material of the antenna reflector 102 comprises a tricot type knit configuration as shown in FIG. 2. The present solution is not limited in this regard. Other types of knit configurations can be used herein instead of the tricot knit configuration. The tricot type knitted material 200 has an opening count of 10-100 per inch. Each opening 202 is defined by multiple loops of CNT yarn 204. The tricot type knitted material 200 has an areal density that is less than ten percent of an areal density of a tricot type knitted mesh material formed using a gold plated tungsten or molybdenum wire with a diameter equal to the diameter of the CNT yarn.

Referring now to FIG. 4, there is provided a flow diagram of an illustrative method 400 for making an antenna reflector formed of a CNT material. Using a CNT material in high frequency RF reflector applications has a number of benefits. For example, CNT materials with CTEs of near zero decrease thermal sensitivity and enable higher-frequency antenna reflectors. CNT materials with solar reflectivity of approximately one facilitates formation of an antenna reflector that is less detectable by adversaries, increasing resiliency. High tailorable CNT materials enable a wider design space (multi-material surfaces, frequency-specific meshes, etc.). Implementing a CNT reflector surface requires forming a flat CNT material into a concave shape.

Method 400 provides a solution for forming a concave shaped CNT reflector surface. Method 400 generally involves: creating or obtaining a CNT material; cutting the CNT material into a plurality of wedge shaped pieces; and bonding together the wedge shaped pieces using a resin film adhesive (e.g., a cyanate ester resin film) to form a concave antenna reflector surface.

Figure 4A:
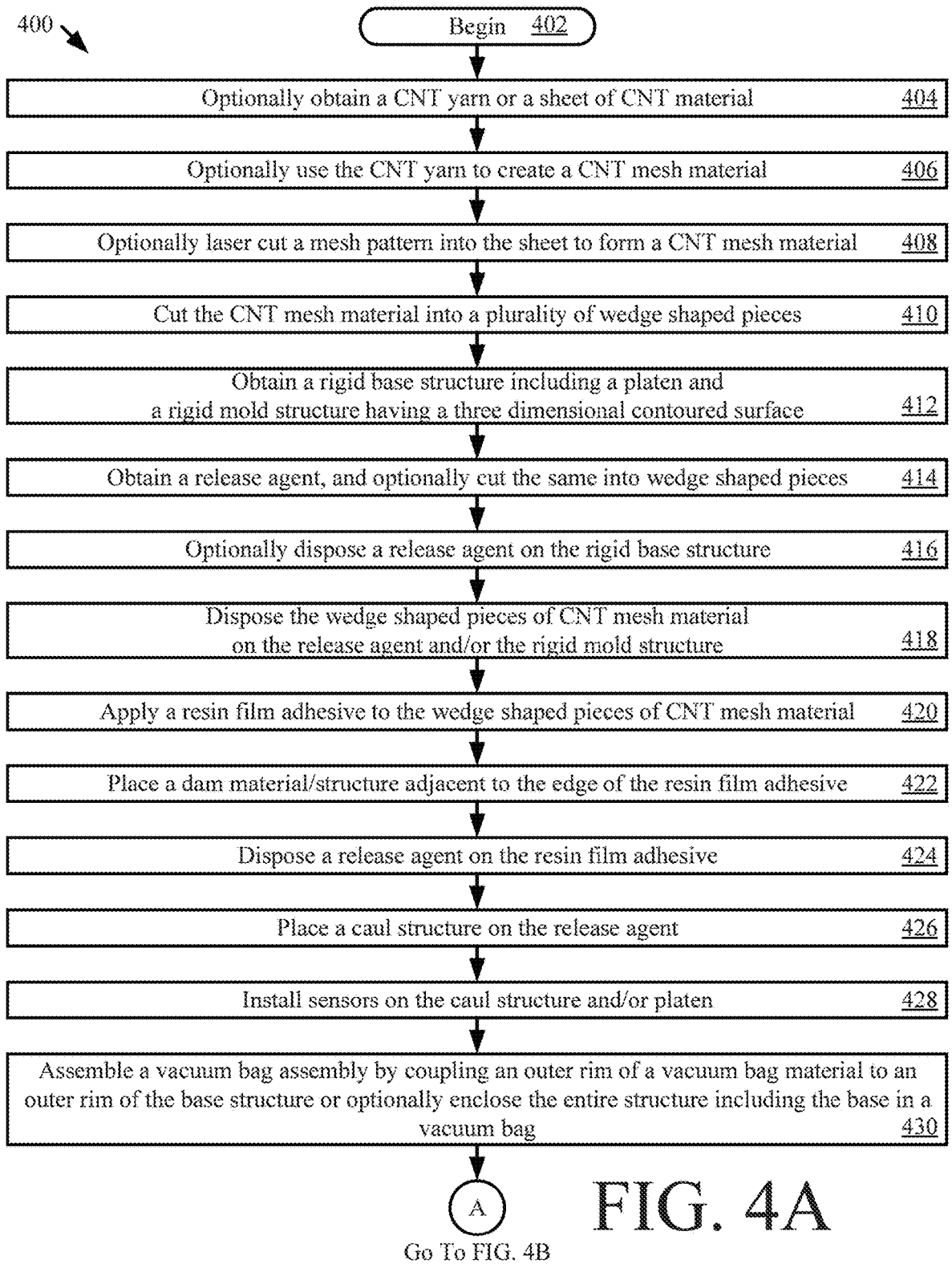
FIGS. 4A-4B (collectively referred to as "FIG. 4") provides a flow diagram of an illustrative method for making an antenna reflector using a CNT material.

As shown in FIG. 4A, method 400 begins with 402 and continues with obtaining a sheet of CNT material. In some scenarios, a CNT material is optionally formed using a CNT yarn as shown by 404 and 406. In other scenarios, the CNT material is not formed of a CNT yarn, but instead is formed by laser cutting a mesh pattern into a sheet of CNT material as shown by 404 and 408. In other cases, the CNT material is a solid sheet with no openings.

In 410, the CNT material is cut into a plurality of wedge shaped pieces. The number N of wedge shaped pieces is selected in accordance with a particular application. For example, N can be selected based on a desired geometry of an antenna reflector surface. N can be any integer greater than 2. The wedge shaped pieces can have the same or different overall dimensions. Thus, in some scenarios, the wedge shaped pieces match each other geometrically. In other scenarios, the wedge shaped pieces are different geometrically such that one wedge shaped piece has at least one dimension that is smaller than that of the other wedge shaped piece(s). An illustration of wedge shaped pieces 502 of CNT material is provided in FIG. 5.

Figure 5:
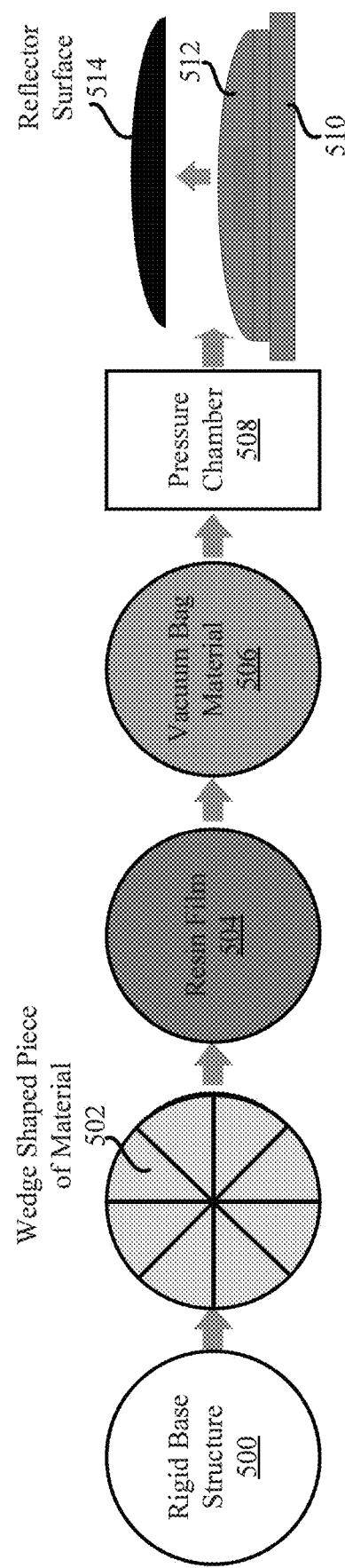
FIG. 5 provides an illustration an illustration of a method for making an antenna reflector using a CNT material.
Figure 6:
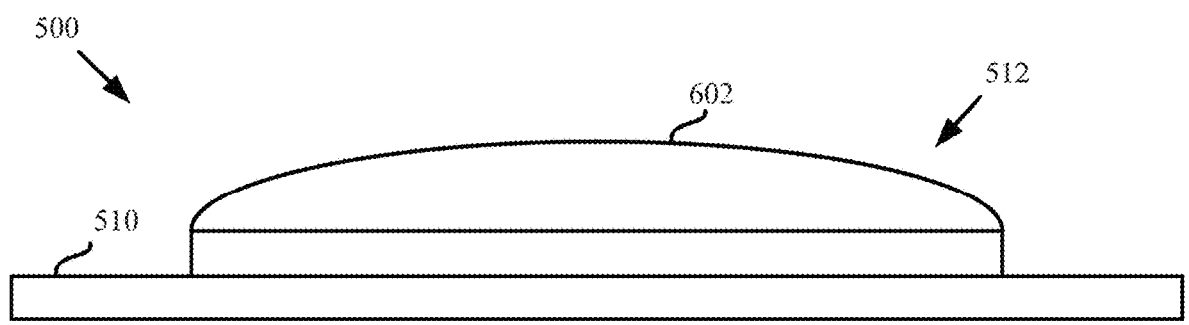
FIG. 6 provides a side view of an illustrative rigid base structure.
Figure 7:
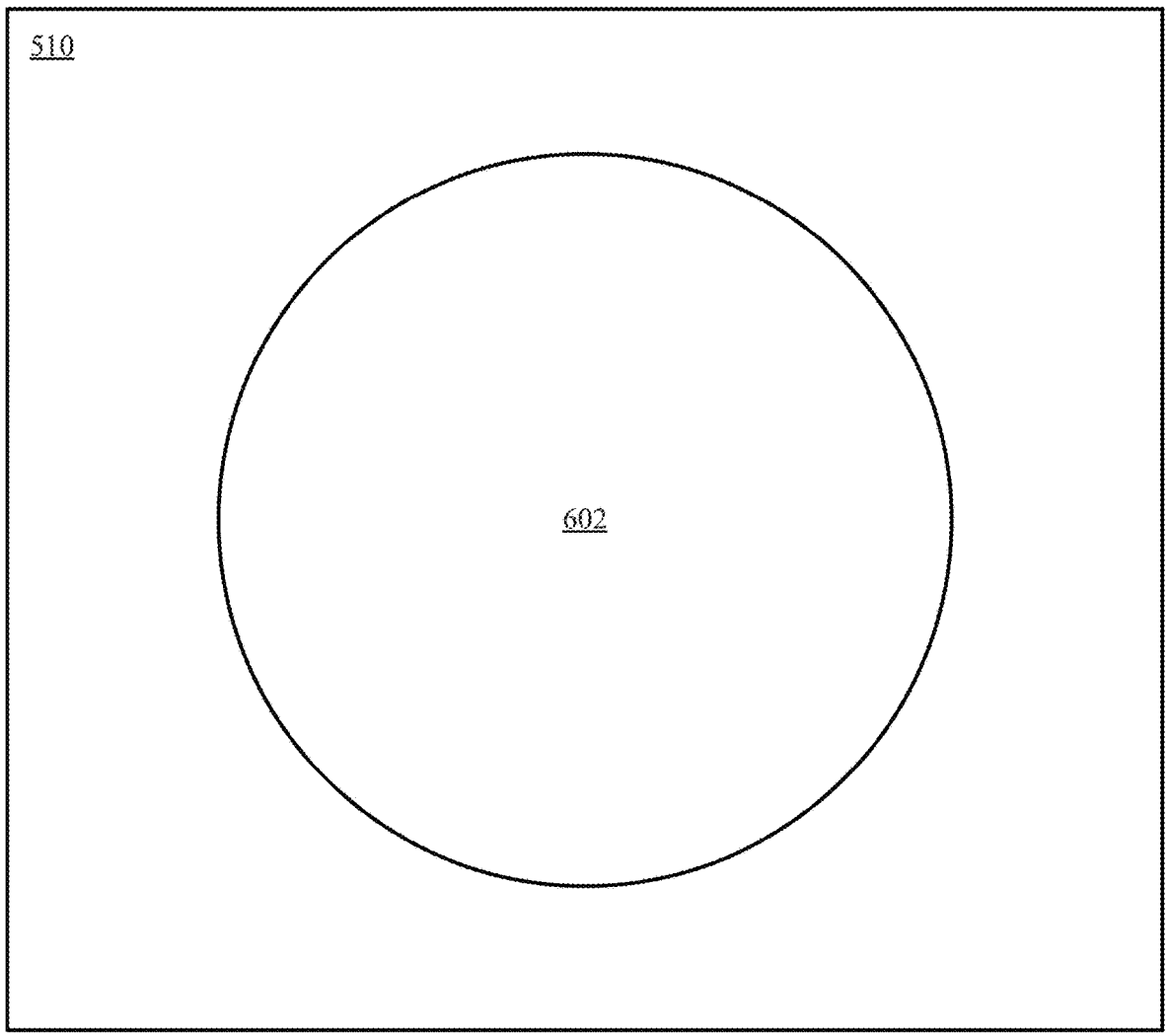
FIG. 7 provides a top view of the rigid base structure shown in FIG. 6.

Next in 412, a rigid base structure is obtained. Illustrations of a rigid base structure 500 are provided in FIGS. 5-7. Side views of the rigid base structure 500 are provided in FIGS. 5 and 6. A top view of the rigid base structure is provided in FIG. 7. As shown in FIGS. 5-7, the rigid base structure 500 comprises a platen 510 and a rigid mold structure 512 that is coupled to or integrated with the platen 510. The rigid mold structure 512 projects out and away from the platen. The rigid mold structure 512 comprises a three dimensional (3D) contoured surface. The 3D contoured surface may be convex or parabolic. The present solution is not limited to the particular architecture of the rigid base structure shown in FIGS. 5-7.

Referring again to FIG. 4A, method 400 continues with 414 where a release agent is obtained. The release agent can include, but is not limited to, films, waxes, sheets and release liners. For example, the release agent may consist of a release film having a product number A5000 which is available from Eagle Alloy Corporation of Tennessee. If the release agent comprises a sheet, it may be cut into wedge shaped pieces. The number of wedge shaped pieces cut here can be the same as and/or different than the number of wedge shaped pieces cut in 410. Also, the overall size and/or shape of the wedge shaped pieces cut in 414 can be the same as or different than that of the wedge shaped pieces cut in 410. The wedge shaped pieces of 414 can have the same or different overall dimensions. Thus, in some scenarios, the wedge shaped pieces match each other geometrically. In other scenarios, the wedge shaped pieces are different geometrically such that one wedge shaped piece has at least one dimension that is smaller than that of the other wedge shaped piece(s).

Figure 8:
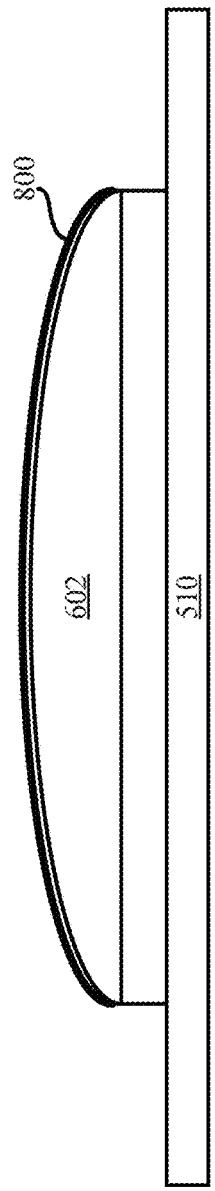

In 416, the release agent is optionally disposed on the rigid base structure. The release agent can be disposed in a manner so that (i) the release agent conforms to the same profile of the 3D contoured surface and (ii) has no surface abnormalities (e.g., wrinkles, ridges, bumps, depressions, folds, etc.). An illustration showing a release agent 800 disposed on the rigid base structure 500 is provided in FIG. 8.

Figure 9:
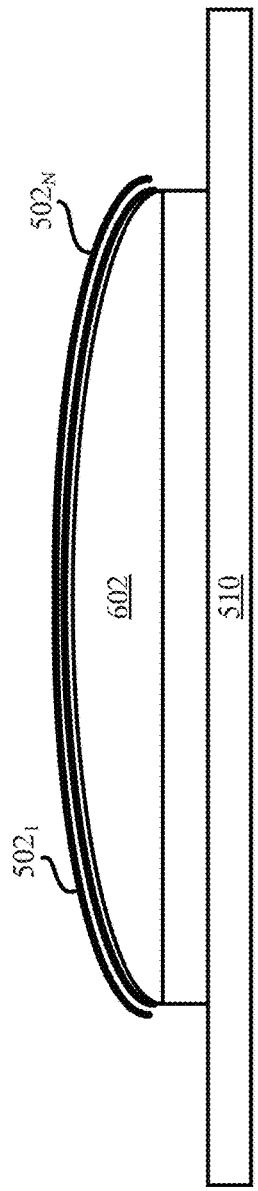

In 418, the wedge shaped pieces of CNT material are disposed on the rigid mold structure and/or the release agent so as to be aligned with the rigid mold structure. An illustration showing wedge shaped pieces 502 of CNT material disposed on the rigid base structure 500 is provided in FIG. 5. An illustration showing wedge shaped pieces $502_3, \ldots, 502_N$ of CNT material disposed on the release agent 800 is provided in FIG. 9.

Figure 10:
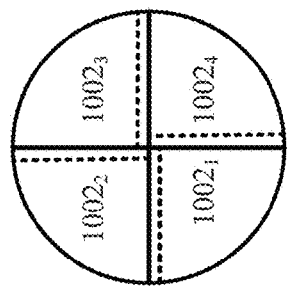

The wedge shaped pieces are disposed in an overlapping arrangement. The amount of overlap between two wedge shaped pieces is selected in accordance with any given application. An illustration showing wedge shaped pieces $1002_3$, $1002_2$, $1002_3$, $1002_4$ of CNT material having an overlapping arrangement is provided in FIG. 10. As shown in FIG. 10, wedge shaped piece $1002_3$ overlaps wedge shaped piece $1002_2$. Wedge shaped piece $1002_2$ overlaps wedge shaped piece $1002_3$. Wedge shaped piece $1002_3$ overlaps wedge shaped piece $1002_4$. Wedge shaped piece $1002_4$ overlaps wedge shaped piece $1002_3$. The present solution is not limited to the particular overlapping arrangement of FIG. 10.

Figure 11:
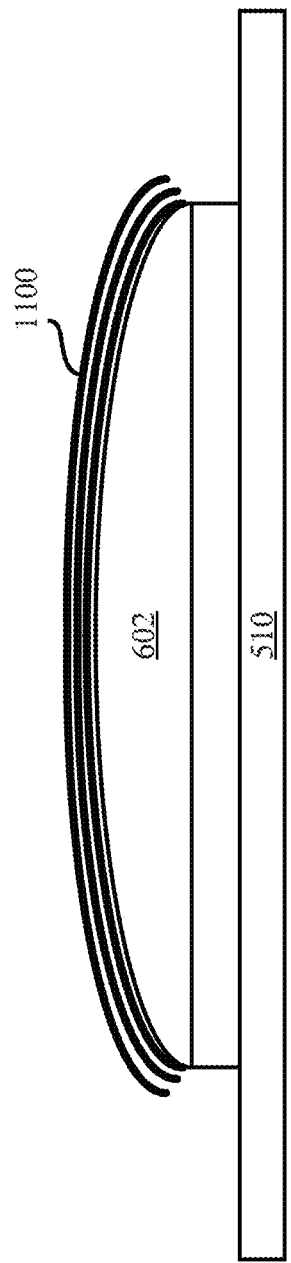

Referring again to FIG. 4A, method 400 continues with 420 where a resin film adhesive is disposed on the wedge shaped pieces of CNT material. The resin film adhesive provides a means to bond the wedge shaped pieces together and stabilize the CNT material to increase mechanical strength and handleability. The resin film adhesive can be formed of any material that experiences no or a minimal amount of shrinkage during a subsequent curing process. For example, the resin film adhesive can comprise a cyanate ester resin having a product number RS3 which is available from Toray Advanced Composites USA of California. An illustration of a resin film adhesive 1100 disposed on the wedge shaped pieces $502_1$, ..., $502_N$ (collectively referred to as "502") of CNT material is provided in FIG. 11.

Figure 12:
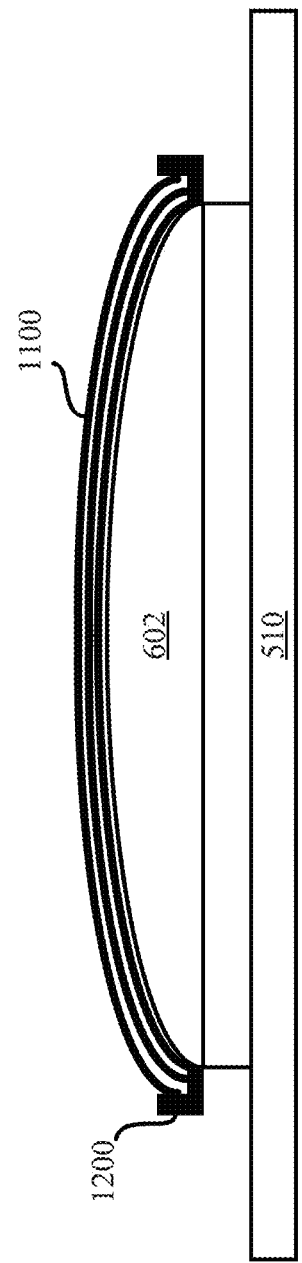

Next in 422, a dam material/structure is placed adjacent to the edge of the resin film adhesive and/or encompasses a perimeter of the resin film adhesive. The dam material/structure can be selected in accordance with any given application. The dam material can include, but is not limited to, a rubber based sheet material, silicone, cork, tape, Invar tabs, metal, and/or any other material that will block, obstruct or otherwise prevent the flow of resin out of a given area during a subsequent curing process. An illustration showing a dam material/structure 1200 placed adjacent to the resin film adhesive 1100 is provided in FIG. 12.

Figure 13:
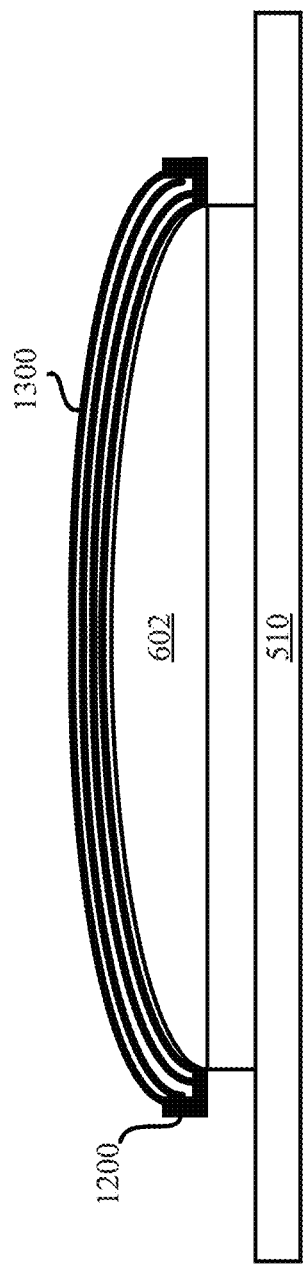

In 424 of FIG. 4A, a release agent is disposed on the resin film adhesive. The release agent can be the same or different than the release agent used in 416. An illustration showing a release agent 1300 disposed on the resin film adhesive 1100 is provided in FIG. 13.

Figure 14:
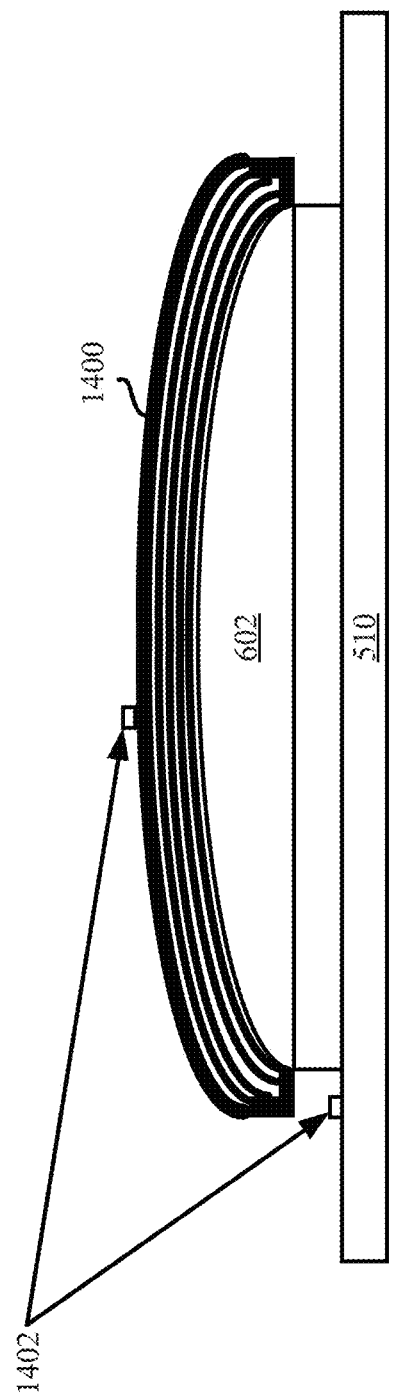

Next in 426, a caul structure is placed on the release agent. The caul structure comprises one or more structural pieces that are free of surface defects. Each structural piece has a shape that conforms to the 3D contoured surface of the rigid mold structure. The caul plate is used to transmit pressure and temperature to the stack of materials during a subsequent curing process. The caul plate facilitates the provision of a smooth surface on the finished product (i.e., an antenna reflector surface). In this regard, the caul plate prevents the wedge shaped pieces of CNT material from wrinkling or otherwise experiencing surface abnormalities during curing. An illustration showing a caul structure 1400 disposed on the release agent 1300 is provided in FIG. 14.

In 428, one or more sensors is installed or otherwise disposed to the caul structure and/or the platen. The sensor(s) is(are) provided to monitor the characteristics of the stack of materials (e.g., materials 800, 502, 1100, 1300) and/or a particular material (e.g., the CNT material 502) in the stack during a subsequent curing process. The characteristics can include, but are not limited to, temperature, stress, surface smoothness, and/or pressure. The sensors can include, but are not limited to, thermocouples, a pressure sensor, a strain gauge, and/or a camera. Each of the listed sensors is well known. An illustration showing sensors 1402 disposed on the platen 510 and caul structure 1400 is provided in FIG. 14.

Figure 15:
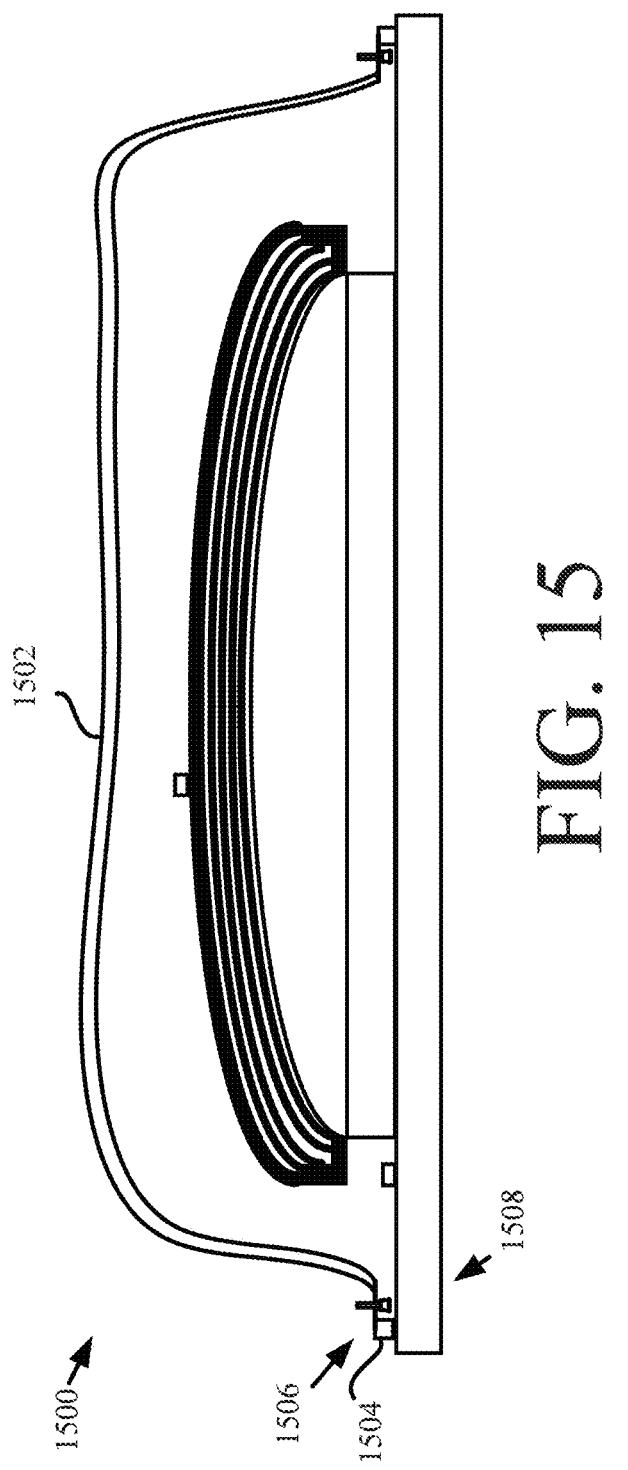

As shown in FIG. 4A, method 400 continues with 430 where a vacuum bag assembly is assembled. A side view of an assembly vacuum bag assembly 1500 is provided in FIG. 15. As shown in FIG. 15, the vacuum bag assembly 1500 is comprises of a vacuum bag material 1502 disposed on the caul structure 1400. The vacuum bag material 1502 comprises any bag material that can withstand heat and pressure of the subsequent curing process, and that would not interfere with the curing of the resin film adhesive. For example, the bag material can be a flexible dimensionally stable film having product number P/N HS-6262 which is available from Solvay USA Inc. of West Virginia, or Kapton® available from E.I. Du Pont De Nemours and Company of Wilmington, Delaware. The vacuum bag material 1502 forms a seal with the rigid base structure 500. For example, an outer rim 1506 of the vacuum bag material is coupled to an outer rim 1508 of the rigid base structure with a sealant means 1504. The sealant means includes, but is not limited to, a mechanical connector means, a sealant tape, epoxy, adhesive, and/or glue.

Figure 4B:
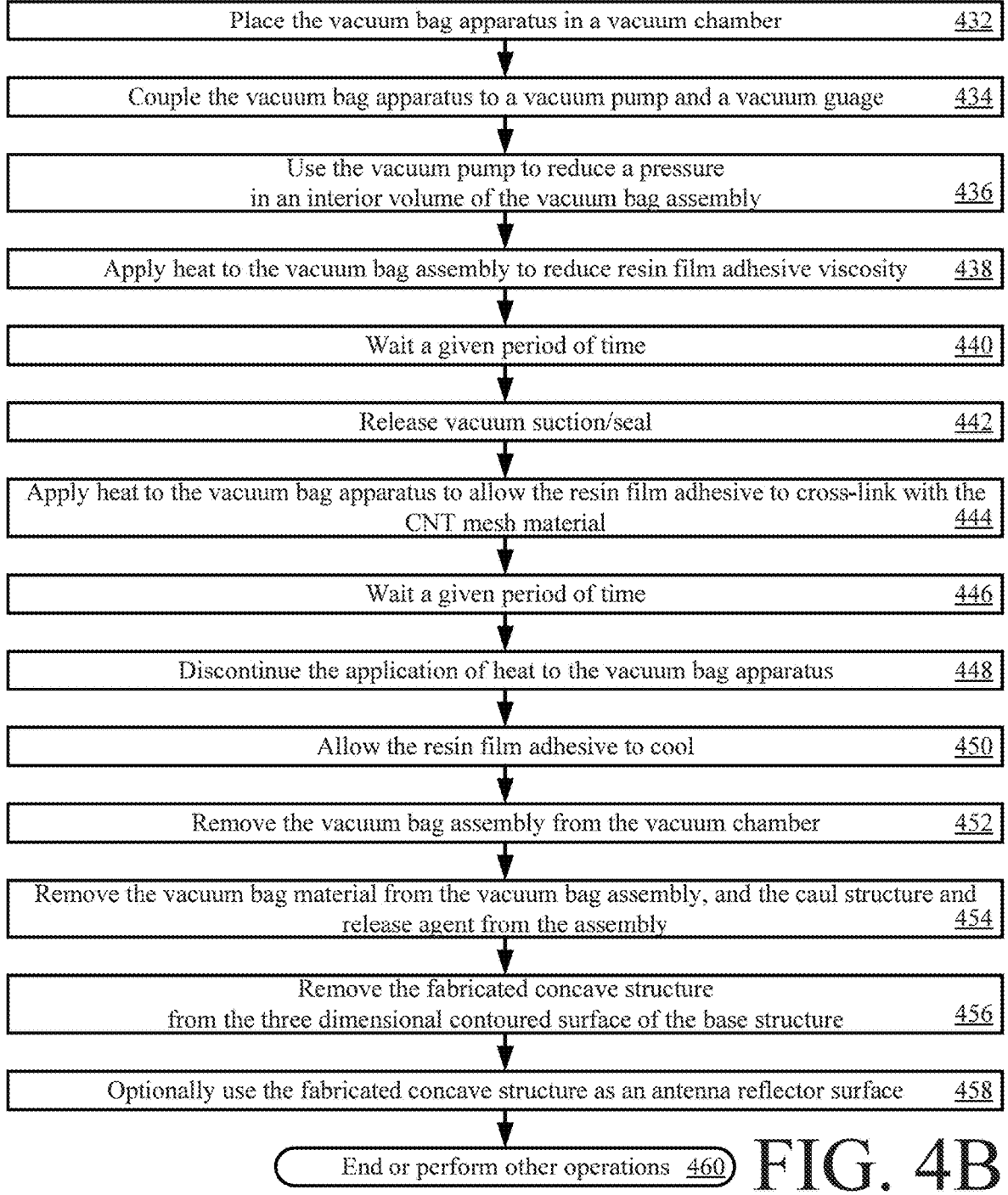
Figure 16:
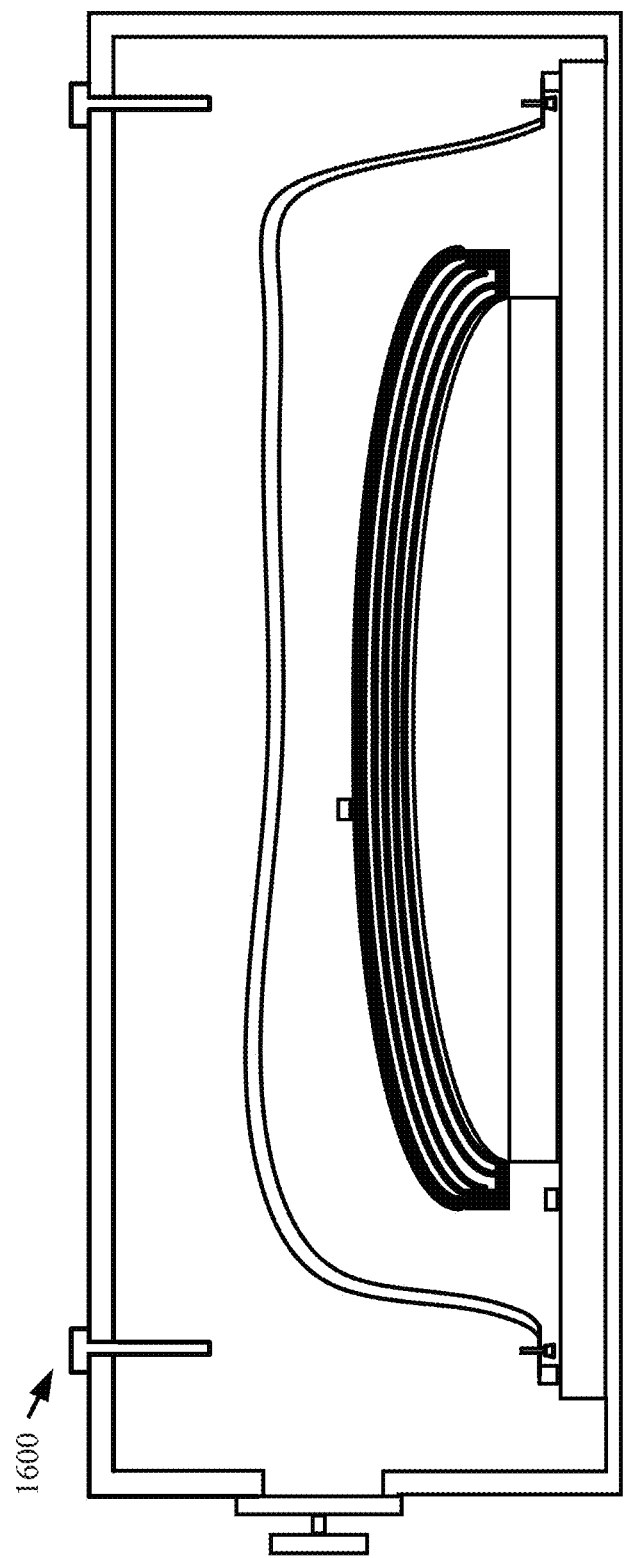

Upon completing 430, method 400 continues with 432 of FIG. 4B. As shown in FIG. 4B, 432 involves placing the vacuum bag assembly in a vacuum chamber. An illustration of the vacuum bag assembly 1500 disposed in a vacuum chamber 1600 is provided in FIG. 16. In this regard, it should be appreciated that the vacuum chamber 1600 is a container in which heat and pressure can be applied to the materials disposed therein.

In some scenarios, the vacuum chamber 1600 is an autoclave. The autoclave can be selected as an autoclave in which temperature and/or pressure sequences can be software defined and pre-programmed into a memory of the autoclave. For example, the autoclave is an Econo-Clave® available from ACS Process Systems of Sylmar, California. The invention is not limited in this regard.

Referring again to FIG. 4B, method 400 continues with 434 where the vacuum bag assembly is coupled to a vacuum pump and a vacuum gauge. A leak free connection between the vacuum bag assembly and each of the listed devices is necessary for forming an antenna reflector surface by applying different amounts of pressure thereto. An illustration of the vacuum bag assembly 1500 coupled to a vacuum pump 1700 and a vacuum gauge 1702 is provided in FIG. 17.

Figure 17:
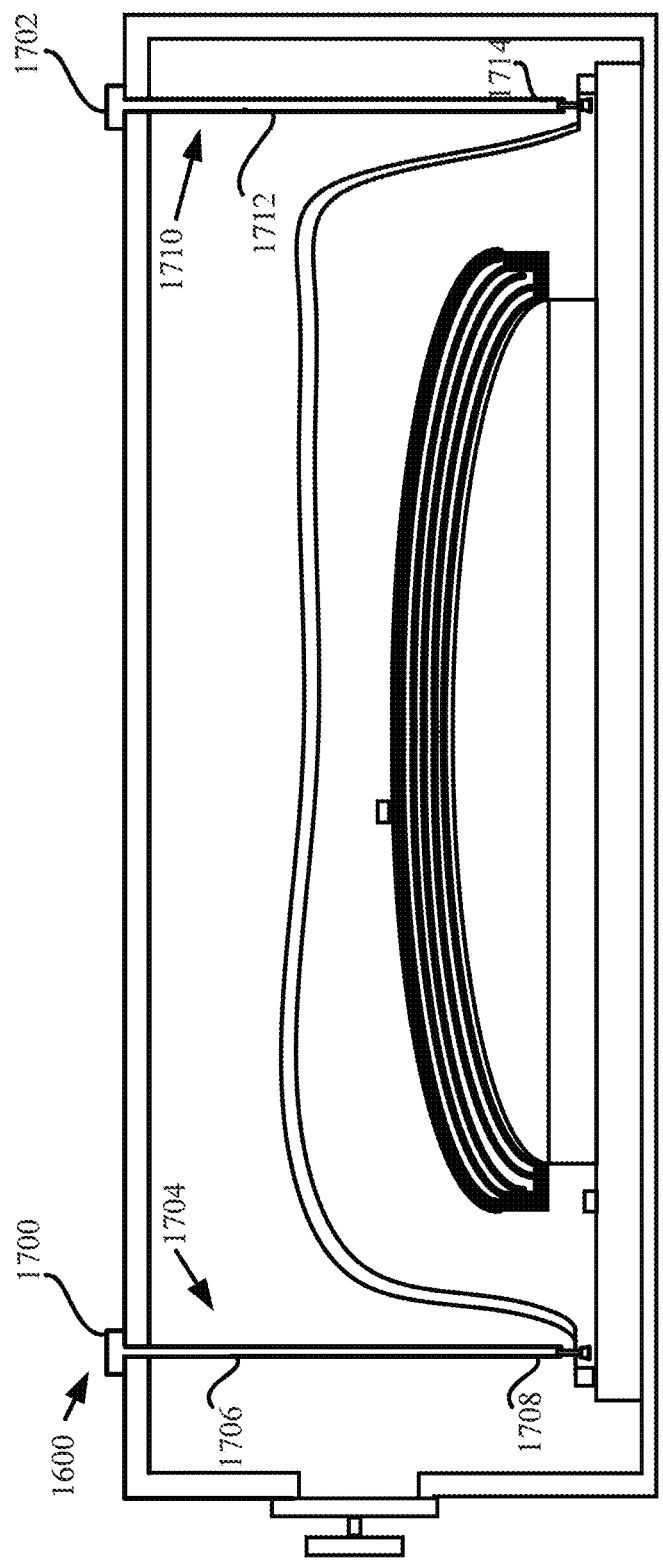

As shown in FIG. 17, a coupling means 1704 is provided for coupling the vacuum bag material 1502 to the vacuum pump 1700. The vacuum pump 1700 is provided for selectively reducing a pressure in an interior volume of the vacuum bag material 1502 by evacuating at least a portion of a gas contained therein. The coupling means 1704 is comprised of a tubular conduit 1706 and a connector means 1708. The a tubular conduit 1706 is selected in accordance with a particular vacuum bag assembly application. For example, the a tubular conduit 1706 is selected as a flexible tube-like structure formed of a material suitable to withstand high temperatures and pressures. The connector means 1708 is configured to maintain a leak-free seal between the vacuum bag material 1502 and the tubular conduit 1706 at high temperatures and pressures. For example, the connector means 1708 is comprised of a top bolt, a seal ring, and a threaded valve base having a vacuum feed through aperture. The present solution is not limited in this regard.

A coupling means 1710 is also provided for coupling the vacuum bag material 1502 to the vacuum gauge 1702. The vacuum gauge is provided for tracking pressures inside the vacuum bag assembly 1500. The coupling means 1710 comprises a tubular conduit 1712 and a connector means 1714. The tubular conduit 1712 is selected in accordance with a particular vacuum bag apparatus application. For example, the tubular conduit is selected as a flexible tube-like structure formed of a material suitable to withstand high temperatures and pressures. The connector means 1714 is configured to maintain a leak-free seal between the vacuum bag material 1502 and the tubular conduit 1712 at high temperatures and pressures. For example, the connector means 1714 is comprised of a top bolt, a seal ring, and a threaded valve base having a vacuum feed through aperture. The present solution is not limited in this regard.

Referring again to FIG. 4B, method 400 continues with 436 where the vacuum pump is used to reduce a pressure in an interior volume of the vacuum bag assembly. This pressure reduction can be achieved by evacuating at least a portion of a gas contained in the interior volume of the vacuum bag assembly. In some scenarios, the gas contained in the interior volume of the vacuum bag assembly is evacuated to at least −20 inches mercury (or 10-14.7 PSI) of pressure inside vacuum bag assembly. The present solution is not limited in this regard.

Figure 18:
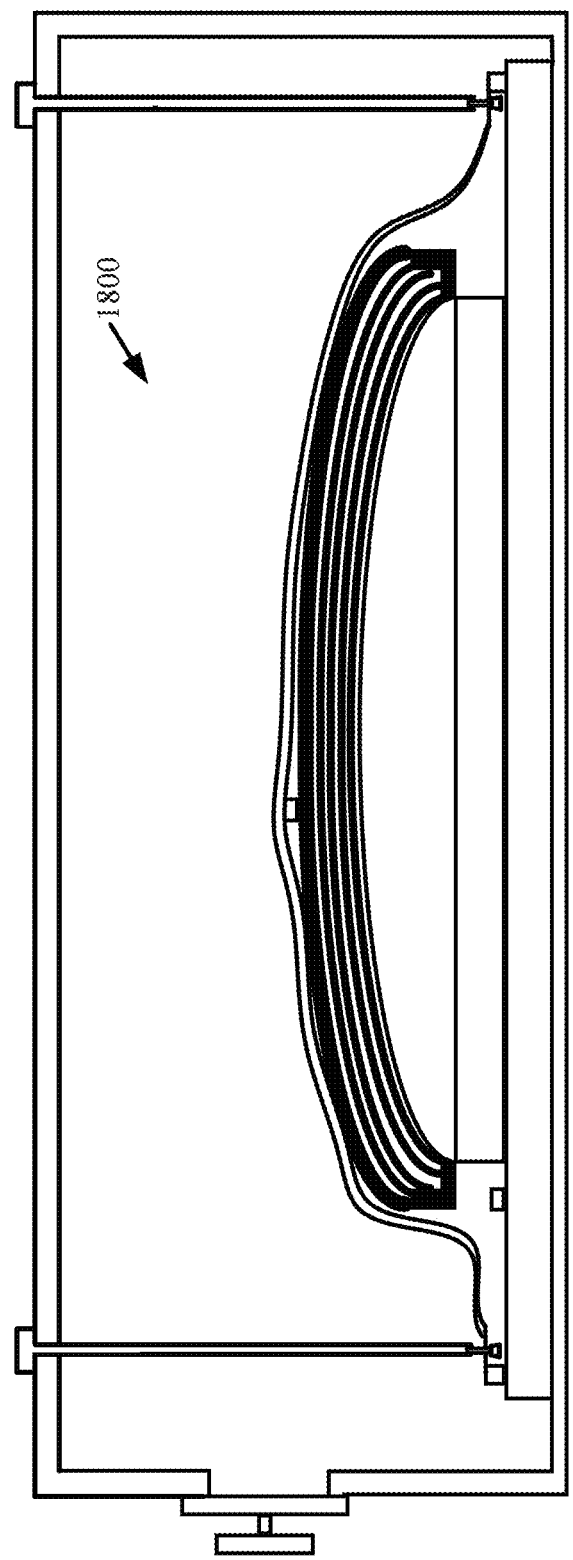

An illustration of an at least partially evacuated vacuum bag assembly 1500 is provided in FIG. 18. As shown in FIG. 18, at least a portion of the gas contained in the interior volume 1800 of the vacuum bag assembly 1500 has been evacuated through use of the vacuum pump 1700. As such, a pressure inside the interior volume 1800 is reduced. In effect, a pressure differential is created between a pressure in the interior volume 1800 and a pressure in an environment external to the vacuum bag assembly 1500.

Figure 19:
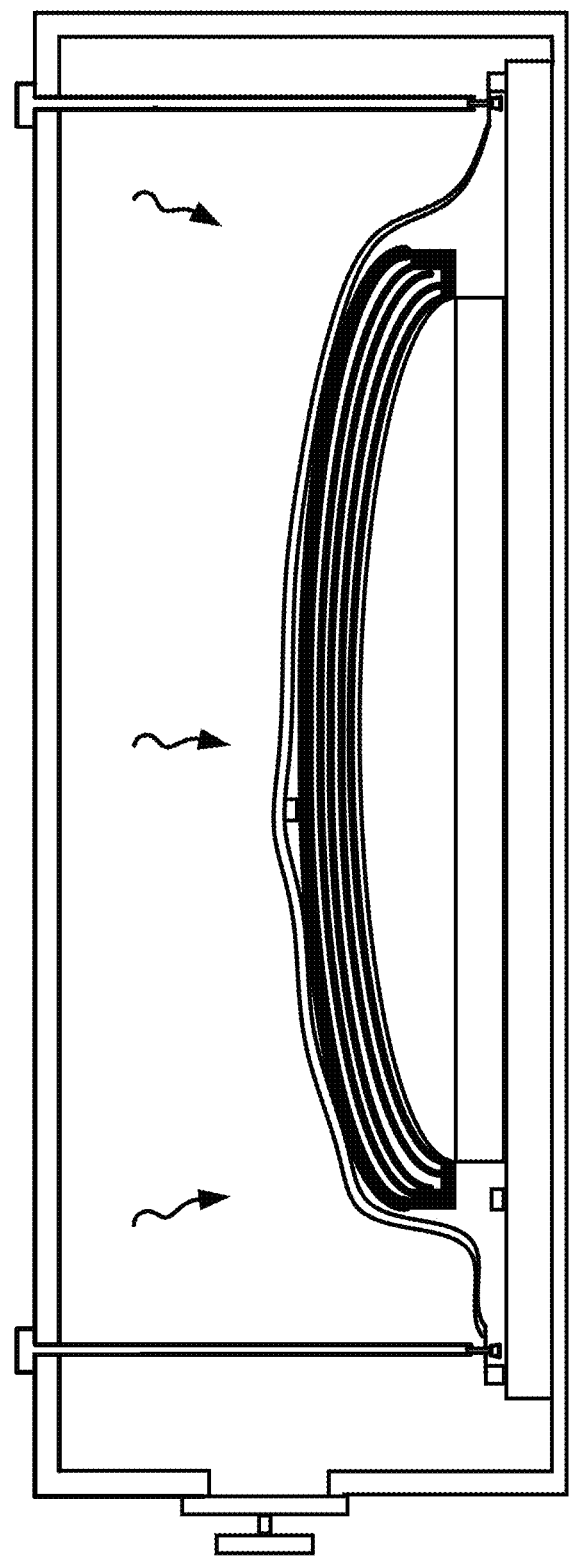

Referring again to FIG. 4B, method 400 continues with 438 where heat is applied to the vacuum bag assembly to reduce a viscosity of the resin film adhesive so that the resin film adhesive flows into the CNT material. In some scenarios, heat inside the vacuum chamber is increased in 438 until the temperature of the CNT material reaches 140° F. The present solution is not limited in this regard. An illustration showing heat being applied to the vacuum bag assembly 1500 is provided in FIG. 19.

Next in 440, the temperature of the CNT material is maintained for a given period of time (e.g., 1 hour). This ensures that the resin film adhesive flows into the CNT material. Once the period of time expires, the vacuum suction and/or seal is released as shown by 442. 442 involves turning off the vacuum pump to let the pressure inside vacuum bag assembly equilibrate to the pressure of the surrounding environment inside vacuum chamber. By performing this vacuum suction/seal release between two heating cycles, the wedge shaped pieces of CNT material are prevented from wrinkling or otherwise deforming due to cure stresses.

In 444, the second heating cycle is begun. Accordingly, heat is applied to the vacuum bag apparatus to allow the resin to cross-link with the CNT material. In some scenarios, heat inside the vacuum chamber is increased until the temperature of the CNT material reaches 350° F. At this time, the resin film adhesive cross-links with the CMT material which results in a stiffening of the CNT material via a chemical reaction. The temperature of the CNT material is maintained for a given period of time (e.g., 2 hours). This period of time is selected to allow the resin film adhesive to continue to crosslink to an acceptable percentage. The present solution is not limited in this regard.

Thereafter, the resin film adhesive is allowed to cool as shown by 450. In some scenarios, the temperature inside the vacuum chamber is decreased so that the temperature of the combined material decreases at a rate of 5°–10° F./minute. The present solution is not limited in this regard.

Figure 20:
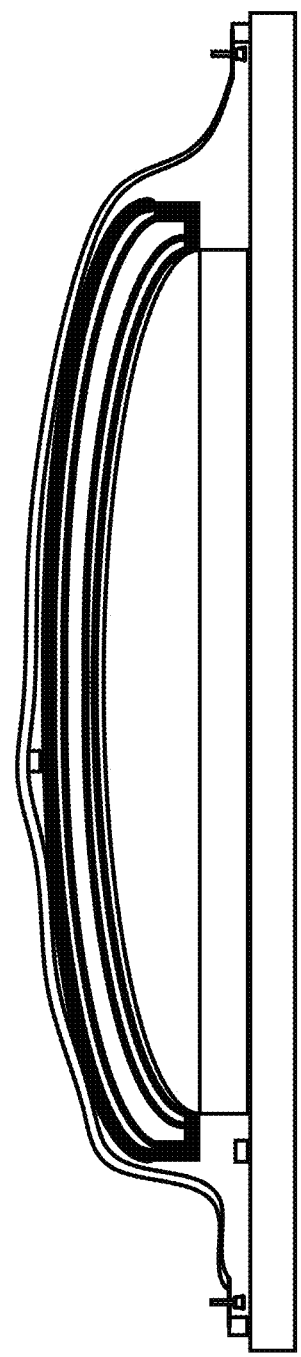
Figure 21:
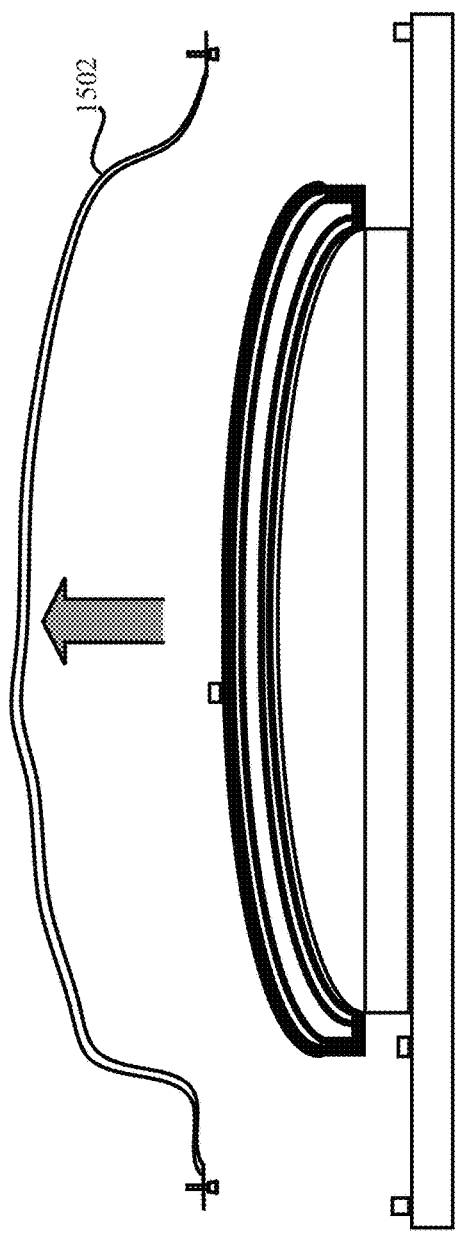
Figure 22:
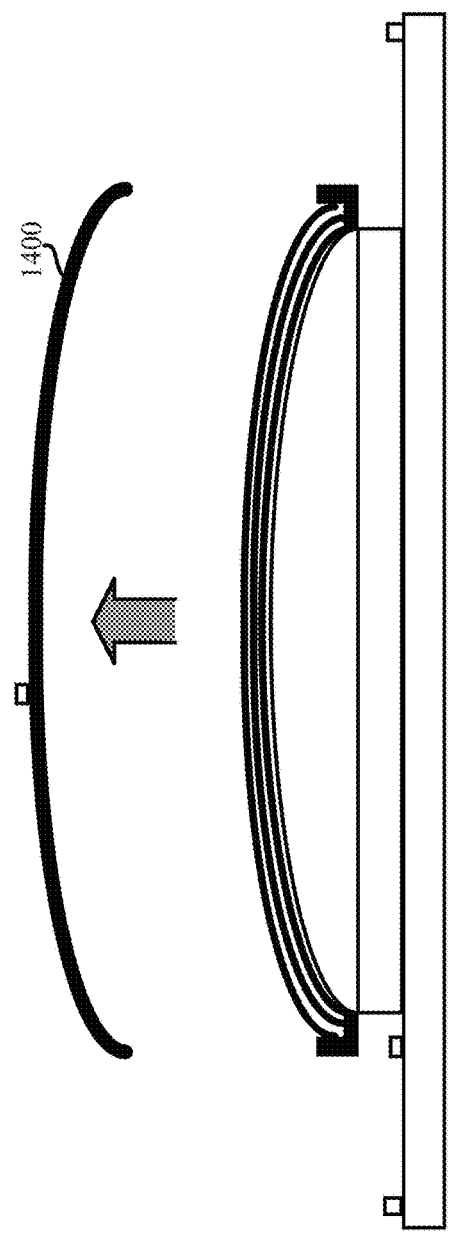

In 452, the vacuum bag assembly is removed from the vacuum chamber. An illustration showing the vacuum bag assembly 1500 removed from the vacuum chamber 1600 is provided in FIG. 20. Thereafter, the vacuum bag material is removed from the vacuum bag apparatus as shown by 454. An illustration showing the vacuum bag material 1502 removed from the vacuum bag assembly 1500 is provided in FIG. 21. The caul structure and release agent are also removed from the assembly in 454. An illustration showing the caul structure 1400 removed from the assembly is provided in FIG. 22. An illustration showing the release agent 1300 removed from the assembly is provided in FIG. 23.

In 456, the fabricated concave structure is removed from the 3D contoured surface of the rigid base structure. An illustration showing a fabricated concave structure 2400 being removed from the rigid base structure 500 is provided in FIG. 24. The fabricated concave structure 2400 is then optionally used in 458 as an antenna reflector surface (e.g., antenna reflector 102 of FIG. 1). Subsequently, 460 is performed where method 400 ends or other operations are performed.

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described embodiments. Rather, the scope of the present solution should be defined in accordance with the following claims and their equivalents.

What is claimed is:

1. An antenna, comprising:
   an antenna reflector formed of
   a sheet of a Carbon Nano-Tube ("CNT") material that is cut into separate wedge shaped pieces which are arranged in a pattern so as to form a three dimensional shape, and
   a resin film adhesive cross-linked with the CNT material, configured to maintain the separate wedge shaped pieces in the arranged pattern,
   and providing stiffness to the antenna reflector;
   wherein the resin film adhesive is disposed on a first surface of the three dimensional shape which is opposed from a second surface of the three dimensional shape which is located closer to a mold structure during a formation process of the antenna reflector.

2. The antenna according to claim 1, wherein adjacent ones of the separate wedge shaped pieces overlap each other.

3. The antenna according to claim 1, wherein the resin film adhesive comprises a cyanate ester resin film.

4. The antenna according to claim 1, wherein the sheet of CNT material has a laser cut mesh pattern formed therein.

5. The antenna according to claim 1, wherein the three dimensional shape is a parabolic shape.

6. The antenna according to claim 1, wherein at least one of the separate wedge shaped pieces has an overall size or shape different than an overall size or shape of another one of the separate wedge shaped pieces.

* * * * *